INVENTORS
Earl C. Bunnell,
Leslie W. Barnes.
BY their ATTORNEY

Patented Aug. 8, 1933

1,921,604

UNITED STATES PATENT OFFICE 1,921,604

APPARATUS FOR MANUFACTURING MEDICAL SWABS

Earl C. Bunnell, Stratford, and Leslie W. Barnes, Trumbull Conn., assignors to Q-Tips, Inc., New York, N. Y., a Corporation of New York Application April 2, 1931. Serial No. 527,276

36 Claims. (Cl. 19—145)

The present improvements relate to swab making machines and more particularly to means for automatically applying a wad of cotton to a stick and forming a swab thereover.

In the patent to Gerstenzang, No. 1,721,815, issued July 23, 1929, is disclosed a machine for successively presenting sticks upon which swabs are to be formed, the application of the cotton for this purpose being accomplished by hand. The present improvements, however, eliminate the necessity of such human attention, since, in association with the patented structure, the entire formation of the swabs is automatically accomplished.

A primary object, among others, is to provide an automatically operable mechanism which, in the chosen field, will perform all the functions of the human hand. A further object is to provide a mechanism which will seize and separate a wad of cotton from a supply and apply it to the end of a stick, forming a swab thereover.

Another object is to provide means for predetermining the amount of cotton seized from the supply, conditional upon the quality or grade of cotton. A further object is to provide means for maintaining operation of the mechanism, in the event the stick feeding mechanism fails to present a stick to receive the wad.

Other objects are to provide a mechanism of this character, which is certain in operation and which accomplishes a predetermined cycle with speed and precision. Further objects and advantages will be apparent upon reference to the accompanying specification and drawings, in which:

Figure 1:
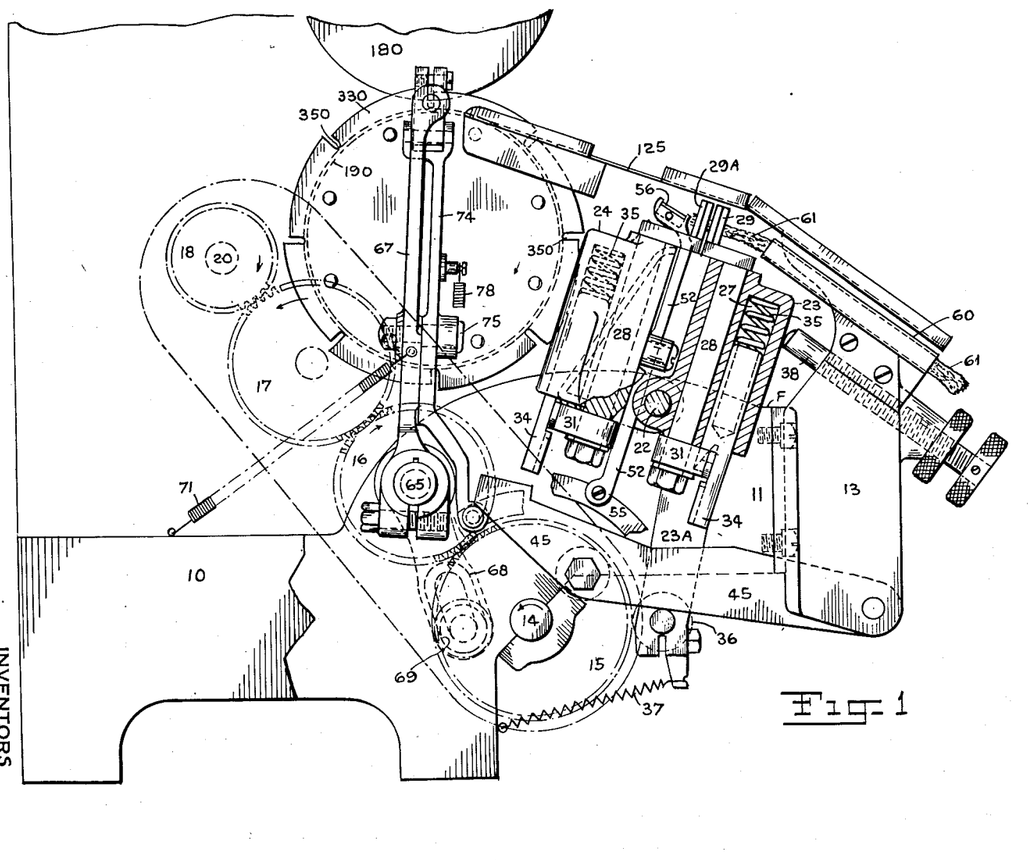
Fig. 1 is a side view with parts removed, broken away and in section illustrating the present improvements.

Referring to the drawings, a support or base 10 is provided upon which is mounted a stick supplying machine such as illustrated in the aforementioned patent. Portions of such a machine are illustrated in Fig. 1, in order to reveal the cooperation of the present improvements therewith, and will be referred to more particularly hereinafter. The base 10 also supports a rigid frame F comprising side arms 11 and 12 which project forwardly therefrom toward the front of the device, where they are joined by a cross frame member 13 constituting the front face of the frame. As later set forth, this frame serves as a support for most of the operative parts of the improvements.

A cam shaft 14 extends across the frame F and protrudes on either side thereof. One end of said shaft is provided with a gear 15, which is in mesh with gears 16, 17 and 18, which serve to transmit power from the main drive shaft 20 of the machine disclosed in the patent, to the cam shaft 14. Disposed above the shaft 14, is another transverse shaft 22, extending across frame F, upon which are journalled independently movable frames 23 and 24. As illustrated, these frames extend above shaft 22 and provide a mounting for cotton gripping jaws.

Figures 3, 4, 5, 15:
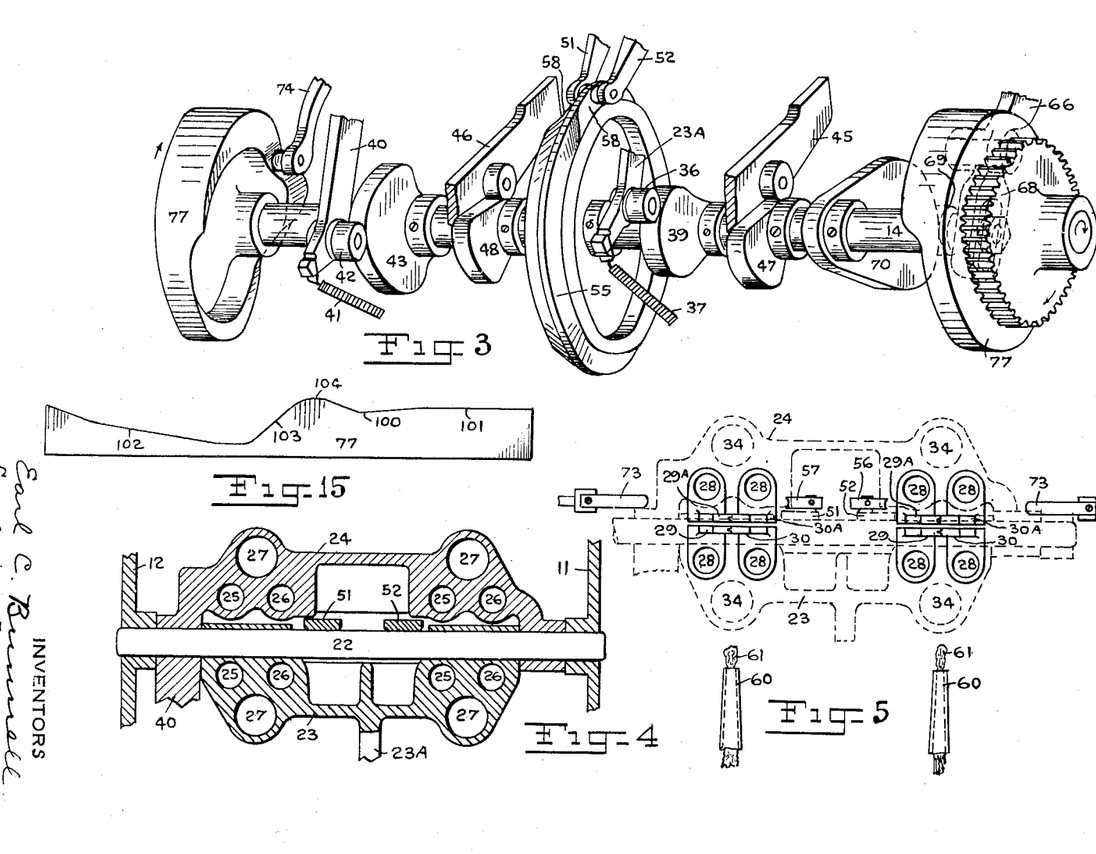
Fig. 3 is a perspective view of the cams and cam shaft at the bottom transfer stage, parts being broken away for convenience in illustration.
Fig. 4 is a transverse section of the oscillating frames with parts removed.
Fig. 5 is a top plan view of the oscillating frames, illustrating the relation of the jaws.
Fig. 15 is a diagrammatic view of cam 77, laid out flat.
Figure 6:
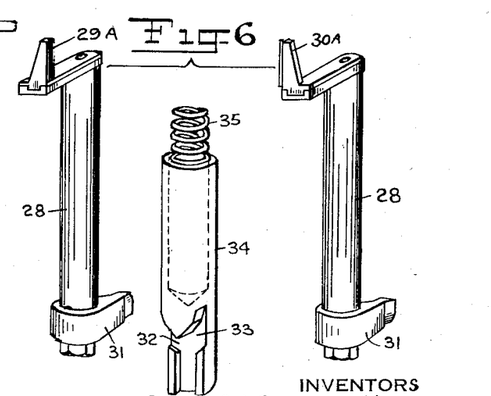
Fig. 6 is a perspective view of a set of jaws and actuating means therefor, illustrated in unassembled relation.
Figure 7:
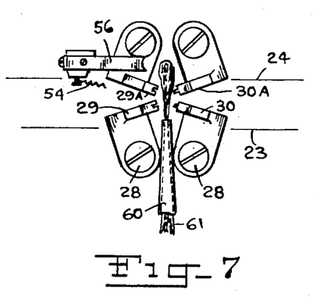
Figs. 7 to 11 illustrate the cooperating jaws at various steps in their cycle of operation.

Referring more particularly to the front frame 23, it is provided on either side of its center with three vertically disposed chambers 25, 26 and 27, the first two of which extend entirely through the frame while chamber 27 is open at the bottom and closed at the top. Rock shafts 28, see Figs. 1 and 6, are disposed in chambers 25 and 26 and have at their upper ends laterally extending arms having upstanding jaws 29 and 30 which project toward each other and meet in cooperative relation with a tongue and groove form as seen in Fig. 5 and others. The lower ends of rock shafts 28 have laterally extending arms 31, which project over and have a portion disposed in cam slots 32 and 33 of a reciprocating plunger 34, which latter is disposed in chamber 27 and protrudes downwardly therefrom. The plunger is urged downwardly by coil spring 35, disposed between the plunger and the closed end of chamber 27. Obviously the downward thrust of plunger 34 by spring 35 causes cam slots 32 and 33 to urge arms 31 away from each other. The rock shafts 28 are thus actuated in opposite directions to cause cooperating jaws 29 and 30 to approach and meet with the tongue of one in the groove of the other. When said jaws are thus closed, portions of arms 31 are also within the cam slots, so that the plunger and spring exert pressure to hold the jaws closed. When the lower exposed end of plunger 34 is pushed upwardly, against the action of spring 35, the cam slots move the arms 31 toward each other, thus actuating shafts 28 and opening jaws 29 and 30 by moving them away from each other. Upon withdrawal of this upward force on plunger 34, spring 35 obviously depresses same and closes the jaws. As previously stated, the mechanism just described is duplicated on the frame 24, one group comprising a plunger and jaws being on one side of the frame and another group on the other side, as seen in Fig. 5.

The entire front frame 23, with its plungers and jaws may be rocked about the pivot shaft 22 by means of a depending arm 23A fixed to the frame and having a free end provided with a bearing 36. A spring 37, anchored to the base 10 and end of arm 23A, urges said arm and frame 23 in a clockwise direction (Fig. 1), which movement is arrested by adjustable stop 38 mounted in cross frame member 13. Movement of said arm and frame in a counter clockwise direction (Fig. 1) against the action of spring 37 is affected by a cam 39 on cam shaft 14. The bearing 36 on arm 23A is held, by spring 37, in the path of travel of cam 39, so that as the latter revolves, the arm and bearing ride thereon and cause frame 23 to rock in a counter clockwise direction, away from stop 38. Accordingly, the cam 39 and spring 37 cooperate to oscillate frame 23 to and fro.

Referring now to the rear oscillating frame 24, it is notable that this frame is also equipped with chambers 25 to 27 having two plungers 28 and two sets of movable jaws 29A and 30A of the type similar to those above described with respect to front frame 23. It is also seen that the plungers and jaws of the oscillating frame 24 are aligned with their complementary members on frame 23 (see Fig. 5), these elements cooperating as hereinafter set forth. Rocking of the rear frame 24 about shaft 22 is effected by arm 40 depending from the frame, said arm being resiliently held by spring 41 anchored to base 10. A bearing 42 on arm 40 is thus held in the path of travel of cam 43 on cam shaft 14, so that when the latter revolves, the arm and frame 24 are rocked in a counter clockwise direction, while spring 41 rocks them in a clockwise direction. As thus far described, it is manifest that frames 23 and 24 are oscillated backwards and forwards independently of each other.

Means for causing upward movement of the plungers 28 and 28 of the frames will now be described. Two levers 45 and 46 are pivoted at their front ends to cross frame member 13, and extend rearwardly beneath the plungers of the oscillating frames. These levers have bearings which ride on cams 47 and 48 on cam shaft 14. As the cams revolve the levers are raised, and engage and push the plungers upwardly for opening the jaws previously referred to. After the cams have performed this work, the levers descend and the plungers do likewise under their respective springs. It is notable that the lever 45 actuates the plungers 28 and 28 and consequently the jaws 29, 30, 29A and 30A, on the right side of the frames 23 and 24 (Figs. 2 and 5) while lever 46 actuates said elements on the left side thereof.

Figure 2:
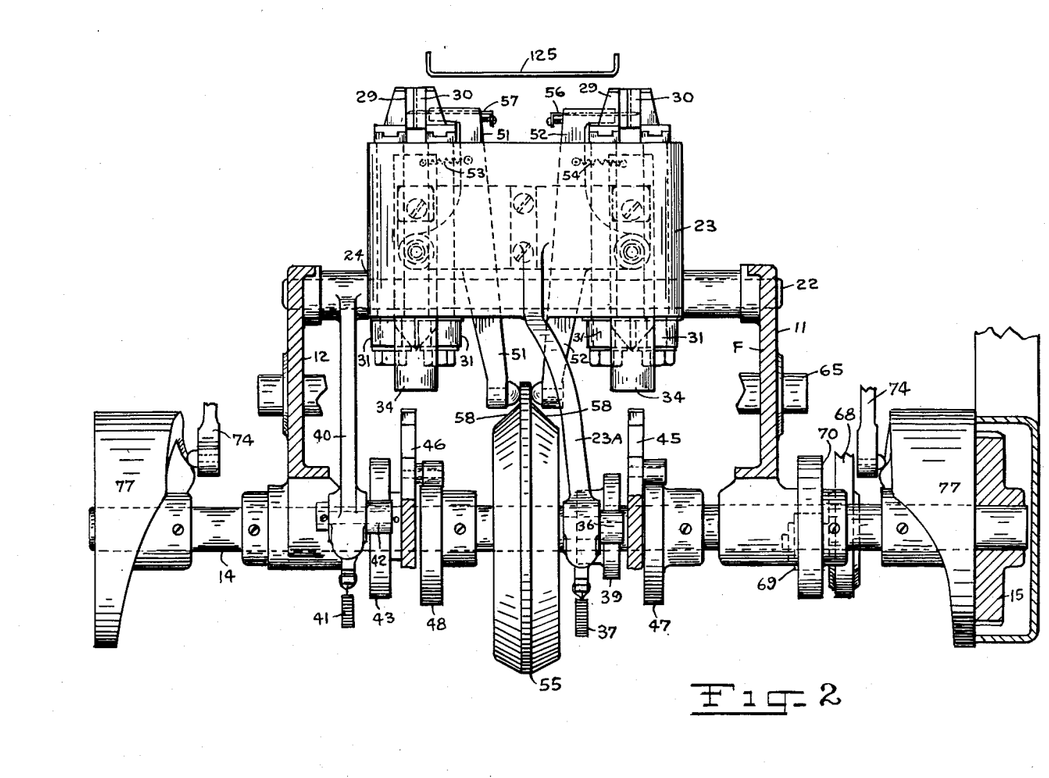
Fig. 2 is a front view partly in section illustrating a portion of the improvements.

Pivotally mounted on rear frame 24 are bell-crank levers 51 and 52 having springs 53 and 54 constantly urging their lower free ends against a cam wheel 55 on cam-shaft 14. The upper free ends of said levers are provided with laterally extending arms 56 and 57. The faces of the cam wheel 55 are provided with recesses 58 into which the ends of the bell cranks enter with each revolution of the wheel. As illustrated, the axes of rotation of the bell crank levers are at right angles to the axis of rotation of frame 24. Accordingly, as wheel 55 revolves, the lower ends of the levers are spread, and the upper ends with lateral arms 56 and 57 move toward each other. However, when the lower lever ends enter recesses 58 of wheel 55, arms 56 anl 57 move away from each other. The location of the bell crank levers on frame 24 (see Fig. 5) is such that arms 56 and 57 reciprocate laterally of the frame, behind and on a level with jaws 29A and 30A as seen in Fig. 2. In the operation thus far described, rotation of the cam shaft 14, causes independent oscillation of frames 23 and 24 about a horizontal axis, vertical reciprocation of plungers 28, 28, and oscillation of the jaws about vertical axes, as well as oscillation of bell crank levers 51 and 52 about transverse axes.

As illustrated in Fig. 1, cross frame member 13 supports a tube 60 which constitute a cotton holding element in which a strand of cotton 61 is frictionally held. Although only one such tube can be illustrated in the side view of Fig. 1, it is understood that there are two such tubes, spaced on the member 13 and mounted in such a manner that the strands of cotton are in alignment with and extend beyond the tubes toward the right hand and left hand sets of jaws of frames 23 and 24 (see Fig. 5). In operation the jaws 29, 30, 29A and 30A open, pass forward along the strands, then close thereabout, whence the jaws 29A, 30A of rear frame 24 move rearwardly while jaws 29, 30 of front frame 23 remain stationary, whereby a wad of cotton is pulled from the strand for use by the carrying fingers now to be described.

Figures 12, 13, 14:
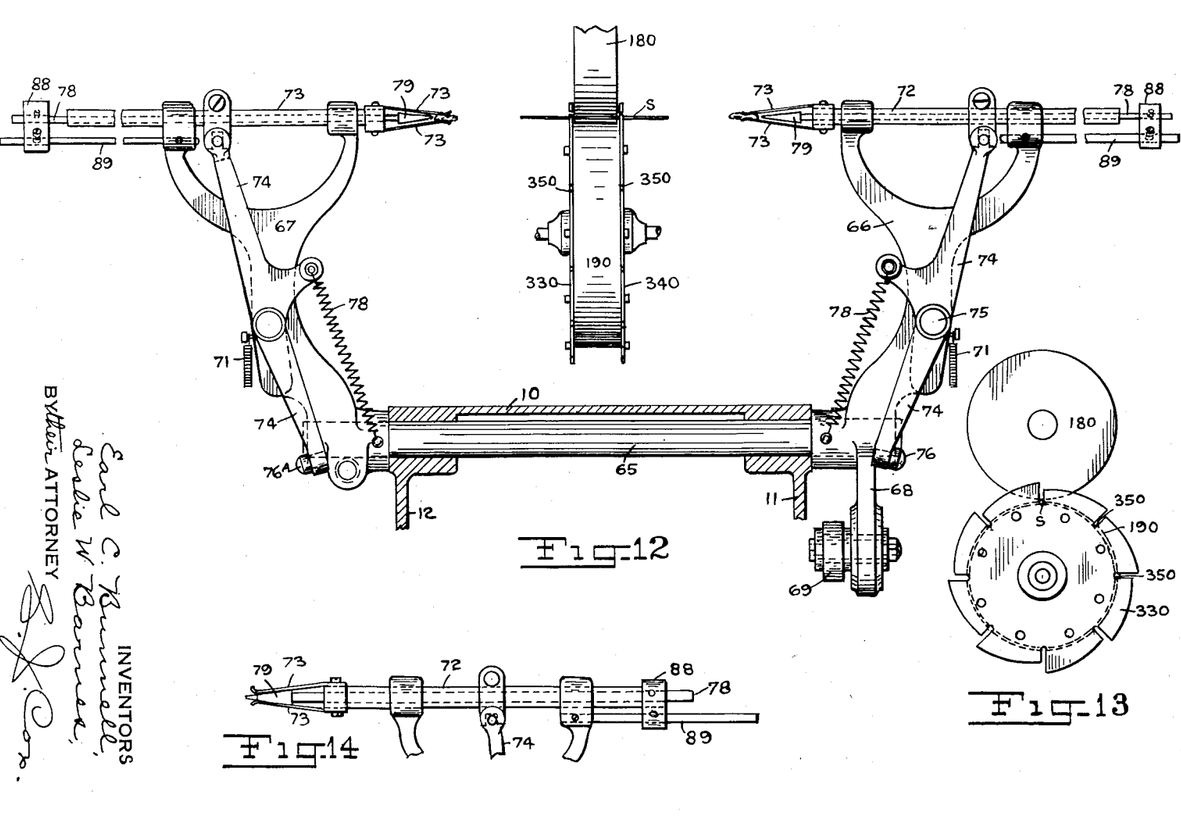
Fig. 12 is a front view of the cotton carrying mechanism about to apply cotton to a stick.
Fig. 13 is a side view of the stick twirling rollers, as illustrated in the patent.
Fig. 14 is a detail showing the manner of ejecting unused wads of cotton.

Mechanism for carrying the wads of cotton and applying them to sticks for forming swabs is illustrated in Figs. 1 and 12. A rock shaft 65 is pivotally mounted on the base 10 or frame F as desired, having forked arms 66 and 67 keyed thereto and extending upwardly therefrom as is apparent in the drawings. Fixed to arm 66 or shaft 65, as desired, is a downwardly and forwardly extending actuating arm 68 having a bearing 69 which is engaged by and rides on cam 70 of cam shaft 14. Accordingly, rotation of the shaft and cam 70 causes clockwise movement (Fig. 1) of shaft 65 and arms 66, 67, while movement in the opposite direction is effected by springs 71 attached to said arms and base 10. The mechanism described therefore causes oscillation of the arms 66 and 67 about the transverse axis of shaft 65.

The forked end of arm 66 loosely supports a slidable sleeve 72 which protrudes beyond the limits of the forks. The inner end of said sleeve is provided with spaced flat spring fingers 73 having their free ends opposed and normally almost meeting. Due to their inherent resiliency, however, these fingers may be readily spread for holding a wad of cotton therebetween. The sleeve 72 and fingers 73 may be oscillated relative to the arm 66 by means of lever 74 pivotally mounted on arm 66 at 75, the upper end of which is operatively connected to sleeve 72. The lower free end of lever 74 carries bearing 76 which rides on the graduated face of cam 77 of shaft 14. A spring 78 anchored to lever 74 and arm 66 maintains bearing 76 against the cam surface 77 at all times. Accordingly, the revolution of cam 77 causes sleeve 72 and fingers 73 to oscillate relative to arm 66. A rod 78 extends through sleeve 72 and terminates in an ejector 79 between fingers 73. When fingers 73 are advanced by arm 74; ejector 79 and rod 78 advance also, but when said fingers are retracted they embrace ejector 79 (see Fig. 14), whereby the latter spreads the fingers and ejects the cotton wad, as waste material, if any, is present at such stage of the operation. A guide member 88 fixed to rod 78 and having sliding but frictionally retarded movement along fixed rod 89 affords this result. Except for the arm 68, the mechanism above set forth is duplicated on arm 67 (Fig. 12) and bearing 76A rides on cam 77 on the left end of shaft 14 whereby the lever, sleeve and fingers on said arm 67 oscillate in the same manner as their companion members previously described.

In Figures 1, 12 and 13, we have shown a portion of the stick feeding mechanism of the aforementioned patent disposed in the proper position relative to the present improvements. Two rollers 180 and 190 having friction surfaces, are suitably mounted for rotation, one above the other, as seen in Figs. 12 and 13. Mechanism illustrated in the patent and not repeated here, which obtains power from main drive shaft 20, rotates these rollers in the same directions, so that when a stick, such as S, is positioned in sandwiched relationship between them, i. e., along the line drawn through the two centers of rotation, the stick will be twirled. As viewed in Figs. 1 and 13, the rollers rotate in a clockwise direction.

Mounted coaxially with respect to roller 190, are two discs 330 and 340 positioned closely adjacent thereto. These discs move simultaneously but independently of the rollers and serve as stick transporting or carrying elements and are provided for this purpose with radial grooves 350. As described in the patent, these discs carry a stick from the supply to the sandwiched position between rollers 180 and 190, where it is held while being twirled, whence the stick is carried away and another one presented between the rollers for twirling. For further details of the foregoing mechanism, reference may be had to said patent.

It is notable that each cam on cam shaft 14, is graduated so as to have a predetermined contour. Furthermore they are mounted on said shaft in a predetermined relation to one another and geared to main drive shaft 20 so as to carry out a predetermined cycle of operation in proper timed relation to the operation of the stick carrying mechanism, which is also driven by the same power source, viz, shaft 20. The improved mechanism is therefore suitably synchronized with the patented structure so as to repeatedly accomplish the cycle in harmony and without interruption or mistake.

Figure 9:
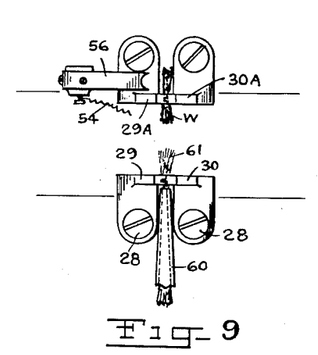
Figure 10:
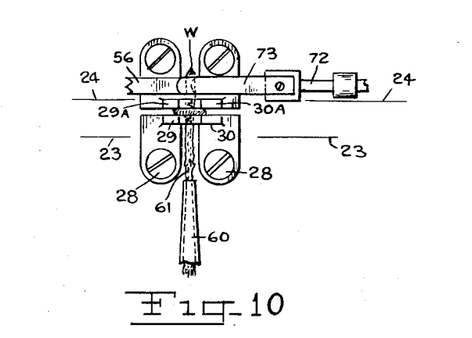

In the operation of the device, the cam shaft 14 moves in the direction of the arrow Figs. 1 to 3. Since the left and right hand groups of jaws 29, 30, 29A and 30A operate simultaneously and in the same manner, the cycle through which they function has been illustrated in various steps in Figs. 7 to 11, by showing only the right hand groups. When the cam shaft 14 is in the position illustrated in Fig. 3, cams 39 and 43 are holding frames 23 and 24 to the rear, i. e., away from stop 38, see Fig. 1. In this position the frames are close together and the jaws are closed as seen in Fig. 10. Spring fingers 73 are behind jaws 29A, 30A and inserter arm 56 is in the act of pushing and transferring the projecting wad of cotton held by the jaws, into the fingers 73.

Figure 11:
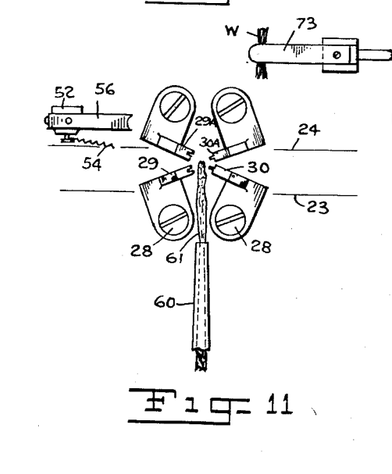

Upon rotation of the shaft 14, inserter 56 recedes, by reason of lever 52 riding up on cam 55 out of recess 58; spring fingers 73 then recede and start to travel with the wad of cotton toward the stick mechanism and simultaneously therewith arms 45 and 46 are elevated by cams 47 and 48, thereby opening all jaws as seen in Fig. 11. While the jaws are thus held open, arms 23A and 40 ride down the sides of their cams 39 and 43, whence the frames 23 and 24 move forward (to the right in Fig. 1) under the influence of springs 37 and 41, so that the open jaws move along the cotton strand 61 to the position seen in Fig. 7.

Figure 8:
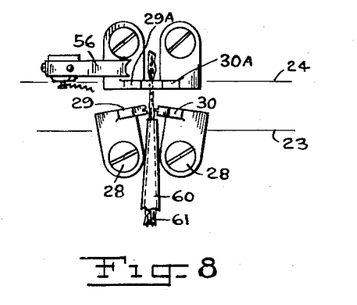

The upper surfaces of arms 45 and 46 are so graduated that when said arms ride down their cams 47 and 48, jaws 29A and 30A of rear frame 23 close around the cottton strand slightly before jaws 29 and 30 of frame 24 close as seen in Fig. 8. Almost immediately thereafter, both sets of paws are closed with the strand of cotton clenched tightly. In this position the arms 45 and 46 have been permitted to descend by the passing on of cams 47 and 48, therefore the spring actuated plungers 28, 28, function to hold the jaws closed.

It is seen upon reference to Fig. 8, that when the jaws are closed, they are holding the cotton strand at spaced points and at a location spaced from the free end of the strand, so that a portion of cotton projects beyond the jaws 29A and 30A. It will be noted that in this position, the frames 23 and 24 are close together. Therefore movement of the frame 24 with closed jaws 29A and 30A to the rear, while frame 23 and closed jaws 29 and 30 remain stationary, will cause a wad of cotton to be torn off of the strand. This is accomplished by further rotation of cam shaft 14 wherein the cam 43 engages arm 40, thereby moving frame 24 to the rear, while frame 23 remains stationary due to the fact that cam 39 (being smaller than cam 43) does not yet engage arm 23A for moving frame 23. This movement of frame 24, separates the sets of jaws with the result that a wad of cotton W is pulled from the strand and held as seen in Fig. 9.

By this time, the spring fingers 73 are approaching to receive the wad of cotton W, and cam 39 engages arm 23A thereby moving frame 23 to the rear, toward frame 24 which is held at the rear by cam 43. This rearward movement of frame 23 with its jaws closed about the cotton strand 61, pulls the latter out of its tubular holder 60, preparatory to forming the next wad therefrom. As this operation transpires, fingers 73 approach the wad W from the side and as they reach same, the inserter arm 56 moves laterally from the opposite side and tucks the wad between said fingers as seen in Fig. 10. As aforementioned, this arm 56 performs this function at this time, by reason of the fact that lever 52 enters recess 58 in cam 55. Further rotation of the cam shaft 14, causes arm 56 to recede, while jaws 29A and 30A open and fingers 73, holding the wad of cotton between them, begin their travel to the stick carrying mechanism. The fresh end of the cotton strand which has been pulled out of holder 60, as above set forth, now stands ready to be gripped by the open jaws, see Figs. 11 and 7, and a new wad of cotton is torn off and held ready for the return of fingers 73, by a repetition of the cycle described.

It is understood that the left hand sets of jaws, inserter arm 57 and corresponding fingers 73 operate at the same time through the cycle just described, so that simultaneously two wads of cotton are formed, one from the right hand strand 61 and one from the left hand strand 61, so that the right and left hand sets of fingers 73, receive and carry away a wad at the same time.

The operation of the mechanism, carrying fingers 73 will now be described. When the cam shaft is in the position of Fig. 3, cam 70, engaging arm 68, is holding forked arms 66 and 67 forward with spring fingers 73 in the act of receiving the cotton wad as seen in Fig. 10. At this time, bearings 76 of levers 74 are riding in depression 100 of cams 77 (see Fig. 15). Upon further rotation of the cam shaft 14, bearings 76 ride on surface 101, so that the fingers 73 holding the cotton have receded a trifle, laterally of the jaws from which the transfer was made. While surface 101 is thus being engaged, cam 70 has passed beyond bearing 69, so that springs 71 retract arms 66 and 67 to the rear and to a position where the right and left hand fingers 73, with the cotton wads, are aligned with the longitudinal axis of stick S of the stick carrying mechanism (See Fig. 12).

The bearing 69 and arm 68 are free of cam 70 for part of a revolution, so that forked arms 66 and 67 are held in the rear position by springs 71. At this time, bearings 76 ride down on surface 102 of cam 77 whereby springs 78 urge levers 74, and consequently fingers 73, toward the stick S (Fig. 12). It will be remembered that the stick is being twirled by rollers 180 and 190, and while in this state, the fingers 73 bring the wads they are holding up to and over the ends of the stick. This movement obviously is lateral, toward each end of the twirling stick, so that the latter meets the wads substantially at their centers and at points between he fingers 73. After this engagement between the stick and the wads at each end, the fingers continue to move over the twirling stick, bringing the ends of the wads around same with the result that the ends thereof are buried in the cotton wads, while the twirling action and the fingers which press towards each other form a neat swab over the ends. The twirling of the stick combined with the pressure of the fingers 73 embracing same in overlapping relation, contribute to the formation of a swab which is of a suitable size over the ends but gradually diminishes in thickness as the cotton is used up.

It will be noted that when the end of the twirling stick meets the cotton brought to it by the fingers 73, that further lateral movement of the cotton ceases, and when the stick thus gets a purchase on the cotton, the latter is twirled and since fingers 73 continue to move laterally, they exert their pressure on the twirling stick and cotton and close thereabout until the cotton is twisted in a neat swab as aforementioned.

When the swab is thus completed, bearings 76 have not quite reached the end of surface 102 of cams 77, but cam 70 now engages arm 68 thus starting the arms 66 and 67, and fingers 73 forwardly, i. e., toward the observer in Fig. 12. This causes the fingers 73 to leave the stick and swab in a direction transversely thereof and without the fingers harming the finished swabs. When the fingers are thus in front of the stick, bearings 76 encounter and ride up on surface 103 of cams 77 while the cam 70 is carrying arms 66 and 67 forwardly toward the vicinity of frames 23 and 24.

The riding of bearings 76 on surface 103 causes receding of sleeve 72 and fingers 73 and when the peak 104 of cam 77 is reached fingers 73 are retracted to the position shown in Fig. 14. In this position the ejector 79 is disposed between and has spread fingers 73, thus ejecting a wad of cotton if one is there. This feature is provided in the event that the stick supplying mechanism has not presented a stick for receiving the wad, so that during the return trip of the fingers, still carrying the cotton, the fingers are cleared for receiving the next wad waiting at jaws 29A and 30A. This ejection occurs with each round trip of fingers 73, so that all failures of the stick carrying mechanism to present a stick, will not disturb the cycle or prevent transfer of the next wad to those fingers. The wad is thus discharged into a waste trough (not shown).

From this position the bearings 76 ride down into depression 100 of cams 77, thus permitting fingers to travel laterally over to and behind jaws 29A and 30A (Fig. 10) where inserter 56 transfers thereto another wad of cotton, whence the trip of the fingers is again repeated.

It is to be noted that as the fingers 73 are returning for a fresh piece of cotton, after having applied the swabs to the stick, the stick carrying discs 330 and 340 move clockwise (Fig. 1) and discharge the finished swab on ramp 125, 120 whence it falls by gravity into a bin or receptacle (not shown) at the front of the mechanism. This movement of the discs, of course, brings up a fresh stick, for twirling between rollers 180 and 190, as set forth in the aforementioned patent.

It is understood that all of the operations are suitably synchronized, so that the cycles are properly timed for perfectly accomplishing the desired results. It is also apparent, that the operation of the device is not retarded or hamperer by the lack of skill on the part of an operator, since all human attention is dispensed with. Accordingly, the speed of operation is determined only by the capacity of the power unit actuating shaft 20, so that finished swabs may be completed at an incredibly fast rate. The length of the cotton strands may be very great, so that little human attention is necessary, except to apply the end of a fresh strand to the holders 60, where the preceding strand is about to be exhausted.

Referring for an instant to Figs. 1, 7, 9 and 11, it will be noted that the forward movement of the open jaws of frames 23 and 24 is effected by springs 37 and 41. This movement is arrested, as previously mentioned, by engagement of frame 23 with stop 38 (Fig. 1). This obviously determined how much of the cotton strand 61 will be seized by jaws 29, 30, 29A and 30A, thereby determining how big a wad of cotton will be torn off for forming a swab. Since the stop 38 is screw threaded for adjustment forwardly or backwardly, the amount of cotton that will be seized and torn off by the jaws can be regulated. This adjustment is of marked importance because the quality or grade of cotton varies. Therefore, a very thick grade of cotton will form a swab of less material than will a thin grade, which would require more material. Accordingly, variations in the quality of the cotton, may be compensated for by this adjustment, so that uniform swabs may be formed, regardless of such circumstances.

If desired, the mechanism may be operated so as to apply a swab at only one end of the stick. Further-more, various members of the device cay be rendered adjustable to compensate for wear or for other reasons. For example, arms 56 and 57 are illustrated as being adjustable, as may also other elements. It is evident that various modifications of the present improvements may be made by those skilled in the art without departing from the scope and purview of the invention. For example, gears provided with suitable cooperating surfaces may be substituted for the jaws 29 and 30 without departing from the scope of the appended claims.

1. In a machine for making swabs, means for supporting a stick with an exposed end, and means for grasping and applying a wad of cotton to the exposed end of such stick and means for withdrawing the stick from said supporting means with the wad thereabout.

2. In a machine for making swabs, means for supporting a stick with an exposed end, and means for grasping and applying a wad of cotton to the exposed end of such stick, one of said means imparting a twirling motion to the material it holds for fixing said wad about said end, and means for removing the stick.

3. In a machine for making swabs, means for successively supporting and twirling a plurality of sticks with exposed ends so that a wad of cotton applied to such ends will form a swab thereover, and means for grasping and applying a wad of cotton successively to the exposed ends of such sticks.

4. In a machine for making swabs, means for supporting and twirling a stick intermediate its ends so that wads of cotton applied to said ends will form swabs thereover, and means for applying wads of cotton to said ends.

5. In a machine for making swabs, means for supporting and twirling a stick intermediate its ends so that wads of cotton applied to said ends will form swabs thereover, and mechanism for forming wads of cotton from a supply and applying them to said ends.

6. In a machine for making swabs, means for supporting and twirling a stick and means positioned adjacent an end of said stick for automatically applying a wad of cotton thereto during the twirling and means for conveying the stick with the swab thereover away from said application means.

7. In a machine for making swabs, a traveling member having spaced stick supports, and means synchronized with said member for grasping and applying wads of cotton successively to the sticks in said supports.

8. In a swab making machine having a stick support, a cotton holding member, and means for automatically forming wads of cotton and feeding them to the position of the stick support.

9. In a swab making machine, a cotton wad forming mechanism including a plurality of means for grasping a strand of cotton at spaced points, and mechanism for moving said means relatively for tearing off a wad of cotton.

10. In a swab making machine, a cotton wad forming mechanism including a plurality of means for grasping a strand of cotton at spaced points, mechanism for moving said means relatively for tearing off a wad of cotton and means for conveying said wad to the point of application.

11. In a swab making machine, a cotton feeding mechanism including means for grasping and conveying a wad of cotton to the point of application, and mechanism for automatically withdrawing said means from the point of application and subsequently freeing said means of the wad after a predetermined time.

12. In a swab making machine, a cotton feeding mechanism including means for grasping and conveying a wad of cotton to the point of application, and mechanism for withdrawing said means from the point of application and subsequently ejecting a wad from said means after a predetermined time.

13. In a swab making machine, a cotton wad forming mechanism including a plurality of means for grasping a strand of cotton at spaced points, mechanism for moving one of said means relative to another for separating a wad of cotton from the strand and adjustable means for governing the size of the wad to be formed.

14. In a swab making machine, means for supporting and twirling a stick with an end exposed, mechanism for applying a wad of cotton to such end including spring fingers for holding the wad to such end and means for moving said fingers over said stick while twirling.

15. In a swab making machine, means for supporting and twirling a stick with an end exposed, mechanism for a wad of cotton to such end including cooperating fingers for holding a wad of cotton therebetween and means for moving said fingers toward and over the end of such stick along its greater axis, said fingers being resilient whereby they may spread to receive the wad and thereafter retract for forming the swab about the twirling stick.

16. In a swab making machine having a stick supporting device and a device for supporting a cotton wad in alignment with the end of said stick, means for moving the material supported by one of said devices toward and into overlapping relation with the other material and means for concurrently rotating one such material relative to the other.

17. In a swab making machine, a cotton wad forming mechanism comprising cooperating jaw members for grasping a strand of cotton, other cooperating jaw members adjacent thereto for grasping said strand, means for moving said second members relative to said first member while all said members are grasping said strand, means adjacent said second members for grasping the portion of the strand held by said members and means for separating said second members.

18. In a device of the character described, a cotton wad forming mechanism including means for supporting a strand of cotton, pairs of cooperating jaw members positioned adjacent said means, at least one member of each pair being movable relative to the other for grasping a strand of cotton at spaced points and mechanism for subsequently moving one pair of members relative to another while grasping the strand of cotton.

19. In a device of the character described, a cotton wad forming mechanism including means for supporting a strand of cotton, pairs of co-operating jaw members positioned adjacent said means, at least one member of each pair being movable relative to the other for grasping a strand of cotton at spaced points, and mechanism for subsequently moving said pairs simultaneously and away from said means while grasping the strand of cotton for withdrawing the strand from said support means.

20. In a device of the character described, a cotton wad forming mechanism including means for supporting a strand of cotton, pairs of co-operating jaw members positioned adjacent said means, at least one member of each pair being movable relative to the other for grasping a strand of cotton at spaced points, mechanism for reciprocating said pairs of members relative to said supporting means and mechanism for simultaneously moving said movable jaw members.

21. In a swab making machine, a receptacle for holding a strand of cotton, means for grasping and holding said strand, mechanism for grasping and pulling said strand away from said means thereby separating a wad therefrom, and means for transferring the cotton wad from said last named mechanism to the point of application.

22. In a swab making machine, means for supporting a stick on which a swab is to be formed, means for grasping a wad of cotton and conveying it to a position adjacent said stick, mechanism for bringing the wad and stick into engagement, and means for applying the wad about the stick end by twirling one of said materials while they are in engagement.

23. In combination, mechanism for supporting and twirling a stick, a receptacle for a strand of cotton, means for grasping the strand at spaced points, mechanism for causing said means to separate a wad of cotton from said strand, and means for picking up said wad and applying it on the twirling stick.

24. In combination, mechanism for supporting and twirling a stick, a tubular member having a strand of fibrous material projecting therefrom, movable jaw members for grasping said strand at spaced points, a cam for moving one jaw member away from another jaw member while holding said strand whereby a wad is separated therefrom, means including at least one spring finger for taking hold of said wad, cam means for releasing said jaw members and cam mechanism for carrying said wad toward the twirling stick and for applying it thereon.

25. A swab making machine comprising, in combination, a rigid frame member, supporting frames movably mounted thereon, gripping means mounted on said frames and movable relative thereto, a supply of fibrous material in position to be seized by said means, and mechanism for actuating said frames and means individually and in unison for separating a wad of material from the supply.

26. A swab making machine comprising, in combination, a rigid frame member, supporting frames pivotally mounted thereon, jaw members journalled on said frames for relative movement, a supply of cotton aligned with said jaws, and cam means for rocking said frames and jaw members concurrently and individually for separating a wad of cotton from said supply.

27. A device as set forth in claim 25, including a member movable relative to said jaws for removing the wad therefrom.

28. A device as set forth in claim 25, including a member pivoted on one of said supporting frames for removing the wad from the jaw members.

29. A device as set forth in claim 25, including a member for seizing the cotton wad and removing it from the region of the jaw members.

30. A swab making machine comprising, in combination, a rigid frame member, a plurality of individually movable frames journalled on said member, a cam shaft having cams for moving said frames in predetermined cycles, jaw members on each of said frames, cams for actuating said jaw members, and a cotton supply aligned with said jaw members.

31. A swab making machine comprising, in combination, a rigid frame member, a plurality of individually movable frames journalled on said member, a cam shaft having cams for moving said frames in predetermined cycles, pivoted jaw members on each of said frames, cams for moving said jaw members in predetermined cycles and a supply of cotton aligned with said jaw members.

32. A device as set forth in claim 25, including a supporting frame movably mounted on said frame member and means on said frame for seizing the wad and carrying it to the point of discharge.

33. A device as set forth in claim 25, including a supporting frame journalled on said frame member, gripping means pivoted thereon and mechanism for actuating said frame and gripping means concurrently and individually for seizing the wad and discharging it at the point of use.

34. In a swab making machine, a wad transferring device comprising a rock frame, spring fingers movably mounted on said frame, a rock arm for actuating said fingers, and mechanism for concurrently and individually rocking said frame and arm.

35. A swab making machine comprising, in combination, a rigid frame member, movable supporting frames mounted thereon, gripping means mounted on said frames and movable relative thereto, a supply of fibrous material adapted to be seized by said means, and mechanism for concurrently and individually actuating said frames and means for removing a portion of the material from the supply to the point of use.

36. A swab making machine comprising, in combination, a rigid frame member, supporting frames journalled thereon, jaw means pivotally mounted on said frames and movable relative thereto, a supply of cotton adapted to be seized by said jaws, and cam means for rocking said frames and jaw means concurrently and individually for removing a portion of the material from the supply to the point of use.

EARL C. BUNNELL.
LESLIE W. BARNES.